United States Patent
Foursa et al.

(10) Patent No.: US 11,923,651 B2
(45) Date of Patent: Mar. 5, 2024

(54) GAIN EQUALIZATION IN C+L ERBIUM-DOPED FIBER AMPLIFIERS

(71) Applicant: SUBCOM, LLC, Eatontown, NJ (US)

(72) Inventors: Dmitri G. Foursa, Colts Neck, NJ (US); Alexei N. Pilipetskii, Colts Neck, NJ (US); Maxim A. Bolshtyansky, Millstone, NJ (US); Gregory M. Wolter, Oakhurst, NJ (US)

(73) Assignee: SubCom, LLC, Eatontown, NJ (US)

( * ) Notice: Subject to any disclaimer, the term of this patent is extended or adjusted under 35 U.S.C. 154(b) by 595 days.

(21) Appl. No.: 16/887,018

(22) Filed: May 29, 2020

(65) Prior Publication Data

US 2021/0376550 A1 Dec. 2, 2021

(51) Int. Cl.
| | |
|---|---|
| *H01S 3/067* | (2006.01) |
| *G02B 27/10* | (2006.01) |
| *H01S 3/00* | (2006.01) |
| *H01S 3/0941* | (2006.01) |
| *H01S 3/10* | (2006.01) |
| *H01S 3/16* | (2006.01) |

(Continued)

(52) U.S. Cl.
CPC ...... *H01S 3/06758* (2013.01); *G02B 27/1006* (2013.01); *H01S 3/0064* (2013.01); *H01S 3/06766* (2013.01); *H01S 3/0677* (2013.01); *H01S 3/0941* (2013.01); *H01S 3/10023* (2013.01); *H01S 3/1608* (2013.01); *H01S 3/2391* (2013.01); *H04B 10/2941* (2013.01); *H01S 2301/04* (2013.01)

(58) Field of Classification Search
None
See application file for complete search history.

(56) References Cited

U.S. PATENT DOCUMENTS

| | | | | |
|---|---|---|---|---|
| 6,049,417 A | * | 4/2000 | Srivastava | .......... H01S 3/06754 |
| | | | | 359/349 |
| 6,104,527 A | * | 8/2000 | Yang | .................... H01S 3/06754 |
| | | | | 359/341.33 |

(Continued)

FOREIGN PATENT DOCUMENTS

| | | |
|---|---|---|
| CN | 101283531 B | 10/2008 |
| JP | 2004343121 A | 12/2004 |

(Continued)

OTHER PUBLICATIONS

EP Search Report dated Oct. 4, 2021, for the EP Patent Application No. 21169345.2, filed on Apr. 20, 2021, 8 pages.

*Primary Examiner* — Eric L Bolda
(74) *Attorney, Agent, or Firm* — KDW Firm PLLC

(57) ABSTRACT

Techniques for improving gain equalization in C- and L-band ("C+L") erbium-doped fiber amplifier (EDFAs) are provided. For example, the C- and L-band amplification sections of a C+L EDFA may be separated and configured in a parallel arrangement or a serial arrangement. For both the parallel and serial arrangements, the C- and L-band amplification sections may share a common gain flattening filter (GFF) or each amplification section may include and employ a separate GFF. Moreover, in some examples, an "interstage" L-band GFF may be located before or upstream of the L-band amplification section such that the L-band optical signal is gain-equalized or flattened prior to the L-band amplification section amplifying the L-band.

5 Claims, 13 Drawing Sheets

(51) Int. Cl.
*H01S 3/23* (2006.01)
*H04B 10/294* (2013.01)

(56) References Cited

U.S. PATENT DOCUMENTS

| | | | |
|---|---|---|---|
| 6,307,668 B1 * | 10/2001 | Bastien | H01S 3/06754 |
| | | | 359/341.5 |
| 6,310,716 B1 | 10/2001 | Evans et al. | |
| 6,424,459 B1 | 7/2002 | Yokota | |
| 6,867,912 B2 | 3/2005 | Hwang et al. | |
| 6,961,522 B1 | 11/2005 | Castagnetti et al. | |
| 7,167,302 B2 | 1/2007 | Doh et al. | |
| 7,295,365 B2 | 11/2007 | Flintham et al. | |
| 10,965,095 B2 * | 3/2021 | Luo | H04J 14/02 |
| 2002/0001124 A1 * | 1/2002 | Kinoshita | H01S 3/13013 |
| | | | 359/341.41 |
| 2003/0058526 A1 * | 3/2003 | Kakui | H01S 3/06758 |
| | | | 359/341.3 |
| 2003/0179440 A1 * | 9/2003 | Foursa | H01S 3/06754 |
| | | | 359/334 |
| 2003/0206334 A1 * | 11/2003 | Hwang | H01S 3/06754 |
| | | | 359/341.5 |
| 2013/0330039 A1 * | 12/2013 | Liu | G02B 6/28 |
| | | | 385/33 |
| 2019/0215090 A1 | 7/2019 | Dangui et al. | |

FOREIGN PATENT DOCUMENTS

| | | |
|---|---|---|
| JP | 3779691 B2 | 5/2006 |
| WO | 2003076979 A9 | 9/2003 |
| WO | 2021141942 A1 | 7/2021 |

* cited by examiner

GAIN EQUALIZATION IN C+L ERBIUM-DOPED FIBER AMPLIFIERS

BACKGROUND OF THE INVENTION

Field of the Invention

Embodiments of the present disclosure relate to the field of optical communication systems. More particularly, the present disclosure relates to improving at least gain equalization in C- and L-band ("C+L") erbium-doped fiber amplifiers (EDFAs) used in optical communication systems.

Discussion of Related Art

Long-haul optical communication systems, such as submarine optical communication systems, generally suffer from signal attenuation resulting from a variety of factors, including scattering, absorption, and bending. To compensate for attenuation, these long-distance systems may include a series of optical amplifiers that are spaced along a signal transmission path and configured to amplify or boost the optical signal in a manner that allows reliable detection at a receiver. Depending on the length of the transmission path, the number of optical amplifiers positioned along the path may vary.

A commonly used optical amplifier in long-haul optical communication systems may be the erbium-doped fiber amplifier (EDFA), which includes an optical fiber doped with erbium (a rare earth element) that can be stimulated by laser (e.g., 980 nm wavelength region, 1480 nm wavelength region) to boost the intensity of certain wavelengths of an incoming optical signal. Typically, EDFAs are used for C-band (approximately 1525 nm to 1565 nm) and L-band (approximately 1568 nm to 1610 nm) optical wavelength bands, where transmission loss in telecommunication optical fibers may be lowest compared to other wavelength bands (e.g., O-band, E-band, S-band).

EDFAs are known to output wavelength-dependent gain. Thus, when an optical signal, such as a wavelength division multiplexed (WDM) optical signal, is amplified by an EDFA, some wavelengths may be amplified more than others. To reconcile inconsistencies in wavelength amplification, a gain-flattening filter (GFF) may be used to restore all wavelengths in the optical signal to approximately the same intensity, which is generally known or referred to as gain equalization or gain flattening.

Various types of GFFs may be used in EDFA design. Generally, an important goal in amplifier design is reducing the overall number of passive components, such as optical isolators, to improve power efficiency of the design. Another important design goal is reducing component-related loss, which minimizes overall loss at the output of the amplifier. Particular system designs, more relevant to long-haul submarine communications, may have performance limited by the available amplifier pump power. In power limited systems, increasing power efficiency and reducing loss in amplifiers may be critical for increasing overall transmission capacity and decreasing costs. For example, short period Bragg grating filters (SP-BGFs) may be used for gain flattening in an EDFA because of the high resolution in loss profile. But a disadvantage of SP-GGFs is that they require additional optical isolation (and thus additional optical isolators) at the input and output of each filter to account for high back reflection.

Other types of GFFs may also be used in an EDFA, such as slanted Bragg grating filters (S-BGFs), thin film filters (TFFs), and long period grating filters (LP-GFs). While these filters do not require optical isolators at both the filter inputs and outputs like the SP-BGFs, a disadvantage of using S-BGFs and LP-GFs, however, could be their physical lengths, which may exceed practical limits and/or require more space in the repeater. Moreover, TFFs (as well as the S-BGFs and LP-GFs) may not be able to achieve sufficient accuracy in gain equalization, and in particular, in broad band applications, such as C+L EDFAs, due to the limited loss shape resolution associated with the TFFs (and S-BGFs and LP-GFs) and limited ability to track steep slopes of the gain profile.

SUMMARY OF THE INVENTION

Techniques for improving gain equalization in C- and L-band ("C+L") erbium-doped fiber amplifier (EDFAs) are provided. For example, the C- and L-band amplification sections of a C+L EDFA may be separated and configured in a parallel arrangement or a serial arrangement. For both the parallel and serial arrangements, the C- and L-band amplification sections may share a common gain flattening filter (GFF) or each amplification section may include and employ a separate GFF. Moreover, in some examples, an "interstage" L-band GFF may be located before or upstream of the L-band amplification section such that the L-band optical signal is gain-equalized or flattened prior to the L-band amplification section amplifying the L-band.

In one embodiment, an apparatus may include a C-band amplification section, an L-band amplification section, a first gain flattening filter (GFF) for performing C-band gain equalization, the first GFF coupled to the C-band amplification section, and a second GFF, different from the first GFF, for performing L-band gain equalization, the second GFF coupled to the L-band amplification section. The C-band amplification section may include at least a first erbium doped fiber (EDF) for amplifying a C-band optical signal, and the L-band amplification section may include at least a second EDF for amplifying an L-band optical signal, where the C-band amplification section and the L-band amplification section are configured in a parallel arrangement.

In another embodiment, an apparatus may include C-band amplification section, an L-band amplification section, a first gain flattening filter (GFF) for performing C-band gain equalization, the first GFF coupled to the C-band amplification section, and a second GFF, different from the first GFF, for performing L-band gain equalization, the second GFF coupled to the L-band amplification section. The C-band amplification section may include at least a first erbium doped fiber (EDF) for amplifying a C-band optical signal, and the L-band amplification section may include at least a second EDF for amplifying an L-band optical signal, where the C-band amplification section and the L-band amplification section are configured in a serial arrangement.

In yet another embodiment, an apparatus may include a C-band amplification section, an L-band amplification section, and a gain flattening filter (GFF) for performing C-band and L-band gain equalization. The C-band amplification section may include at least a first erbium doped fiber (EDF) for amplifying a C-band optical signal, and the L-band amplification section may include at least a second EDF for amplifying an L-band optical signal, where the C-band amplification section and the L-band amplification section are configured in a serial arrangement or a parallel arrangement.

DESCRIPTION OF EMBODIMENTS

Figure 1:
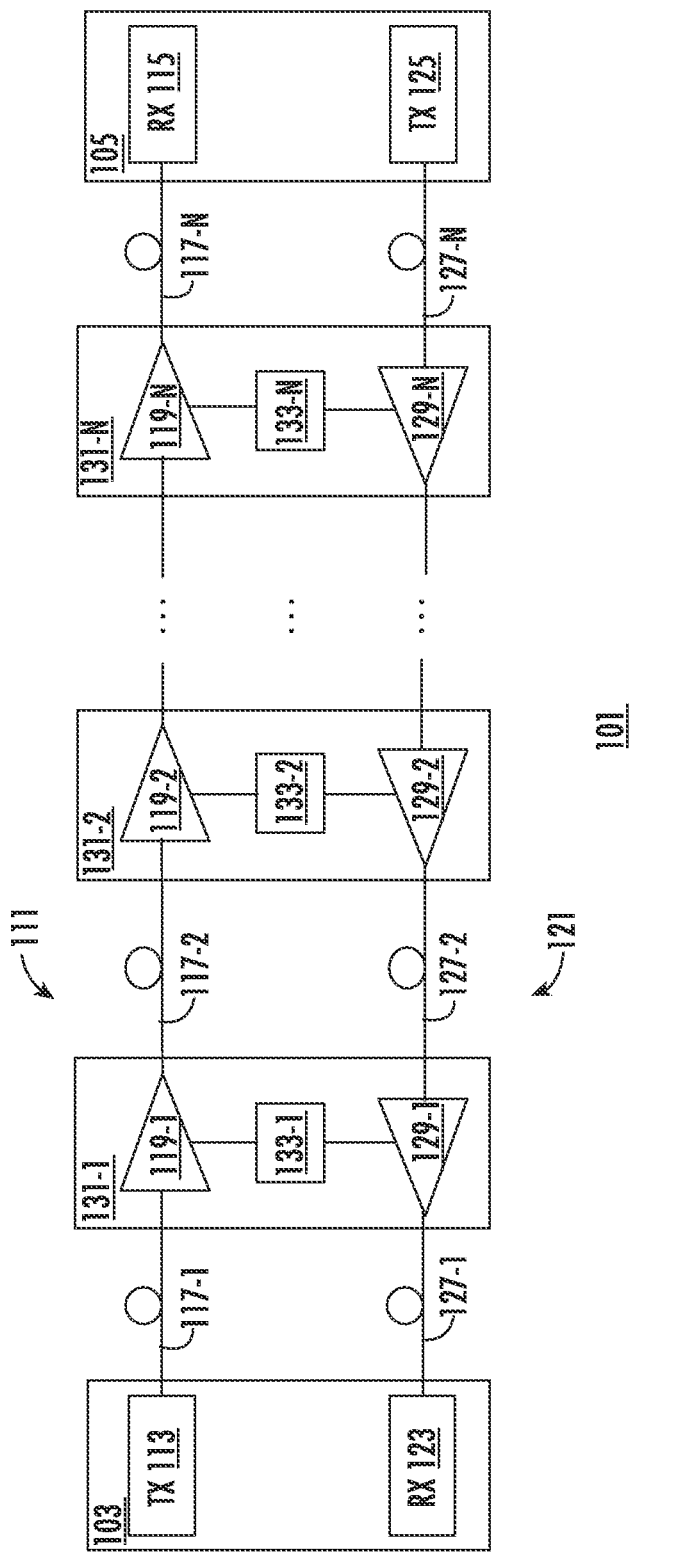
FIG. 1 illustrates an example optical communication system.

The present invention is directed to improving at least gain equalization or flattening in C+L erbium-doped fiber amplifiers (EDFAs) used in optical communication systems by at least separating the C-band and L-band amplification sections of the C+L EDFA in accordance with various arrangements. According to one example, the C- and L-band amplification sections of the C+L EDFA may be configured in a parallel arrangement (which may otherwise be referred to as a "parallel scheme"). According to another example, the C- and L-band sections of the C+L EDFA may be configured in a serial arrangement (which may otherwise be referred to as a "serial scheme").

As will be further described below, there may be at least two variations of the parallel scheme. In the first variation, the C- and L-band amplification sections of the C+L EDFA may share a common GFF. In the second variation, the C-band amplification section may include and may be coupled to a separate C-band GFF and the L-band amplification section may include and may be coupled to a separate L-band GFF. Similarly, for the serial scheme, the C- and L-band amplification sections of the C+L EDFA may share a common GFF, and further, the C- and L-band amplification sections may include separate respective C-band and L-band GFFs.

In further embodiments, a serial scheme may be configured to include an interstage GFF. For example, the L-band GFF may be arranged or located between the C- and L-band amplification sections. Moreover, one or more blocking filters may be integrated in the parallel and/or serial schemes of the C+L EDFAs to at least reduce or narrow the guard band between the transition from C-band to L-band.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Referring to the drawings, FIG. 1 illustrates an exemplary bi-directional optical communication system 101 which may use high-bandwidth fiber optics to transmit vast amounts of data over long distances. Bi-directional data transmission may be implemented by constructing pairs of optical fibers within the optical cable and transmitting one or more channels, e.g., wavelength division multiplexed channels, per fiber pair.

As shown, the optical communication system 101 may include terminals 103 and 105 connected by two unidirectional optical paths 111, 121, which together form a bi-directional optical fiber pair. Optical path 111 may transmit information in one direction (e.g., to the right) from a transmitter 113 at terminal 103 to a receiver 115 at terminal 305. Optical path 121 may transmit information in the other direction (e.g., to the left) from a transmitter 125 at terminal 105 to a receiver 123 at terminal 103. With respect to terminal 103, the optical path 111 is an outbound path and the optical path 121 is an inbound path. The optical path 111 may include optical fibers 117-1 to 117-$n$ and optical amplifiers 119-1 to 119-$n$, and the optical path 121 may include optical fibers 127-1 to 127-$n$ and optical amplifiers 129-1 to 129-$n$. The one or more of the optical amplifiers 119-1 to 119-$n$ and 129-1 to 129-$n$ may be EDFAs, such as C+L EDFAs. It may be understood that, in some examples, transmitter 113 and receiver 123 may be housed together as a transponder at terminal 103, and similarly, transmitter 115 and receiver 125 may also be housed together as a transponder at terminal 105.

The optical path pair (e.g., optical paths 111, 121) may be configured as a set of amplifier pairs 119-1 to 119-$n$ and 129-1 to 129-$n$ within repeaters 131-1 to 131-$n$ connected by pairs of optical fibers 117-1 to 117-$n$ and 127-1 to 127-$n$, which may be included in an optical fiber cable together with fibers supporting additional path pairs. Each repeater 131 may include a pair of amplifiers 119, 129 for each path pair and may include additional amplifiers for additional path pairs. The optical amplifiers 119, 129 may utilize EDFAs or other rare earth doped fiber amplifiers, Raman amplifiers, or semiconductor optical amplifiers (SOAs). A coupling path 133-1 to 133-$n$ may be coupled between optical paths 111, 121, for example, in one or more of the repeaters 131-1 to 131-$n$. It may be understood that the term "couple" or "coupled," as used herein, broadly refers to any connection, connecting, coupling, link, or linking, either a direct or indirect or a wired or wireless connection and does not necessarily imply that the coupled components or elements are directly connected to each other.

Although an exemplary embodiment of the optical communication system 101 is shown and described, variations of the optical communication system 101 are within the scope of the present disclosure. The optical communication system 101 may include, for example, more optical path pairs and more or fewer repeaters. Alternatively, the optical communication system 101 may not include any optical amplifiers or may include, instead of optical amplifiers, optical pump power sources suitable for implementing optical gain by Raman amplification within optical fibers connecting repeaters.

Moreover, it may be understood that the transmitters, receivers, transponders containing the transmitters and receivers, or any other suitable device for transmitting and receiving data, may be include at least one memory and one or more processors (e.g., CPU, ASIC, FGPA, any conventional processor, etc.) to execute instructions stored in memory.

Figure 2:
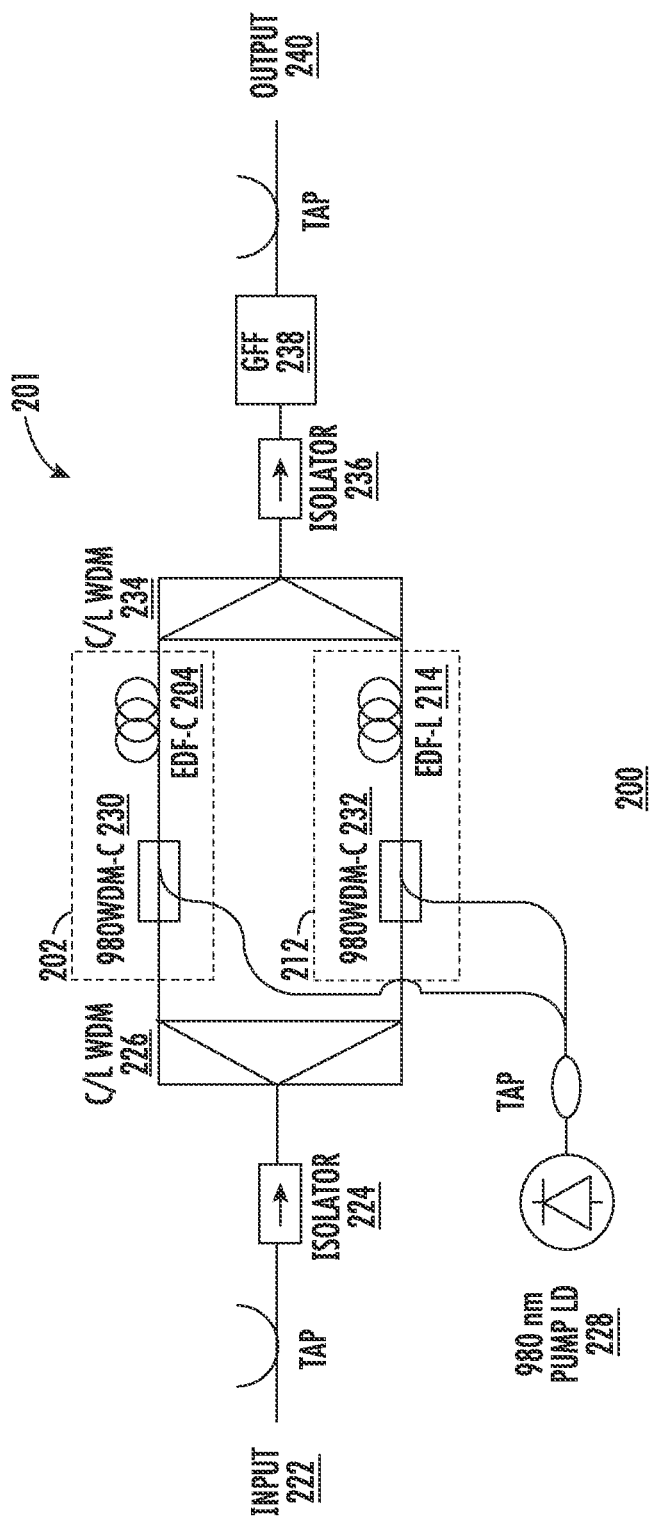
FIG. 2 illustrates a first example parallel scheme of a C+L EDFA.

FIG. 2 illustrates an example parallel scheme 200 of C+L EDFA 201 according to embodiments. The C+L EDFA 201 includes at least a C-band amplification section 202 (e.g., C-band amplification stage) and a L-band amplification section 212 (e.g., L-band amplification stage), as indicated by the dashed-boxes. As shown, the C-band and L-band amplification sections 202 and 212 are configured in a parallel arrangement, which may be understood to be an arrangement having two or more separate and independent optical signal paths for the C- and L-band amplification sections, e.g., amplification in the respective sections are performed on separate paths, and thus, amplification of one section does not affect the other section and vice versa. It may be understood that some degree of interaction between the C- and L-band amplification sections is possible due to the limited performance of bandwidth dividing components, such as C/L WDM 226 and 234. The C-band section 202 includes EDF-C 204, which is an erbium doped fiber configured to amplify the C-band (e.g., C-band wavelengths of a C-band optical signal), which may otherwise be referred to as a C-band EDF, using light pumped at a 980 nm wavelength region. Similarly, the L-band section 212 includes EDF-L 214, which is also an erbium doped fiber that amplifies the L-band (e.g., L-band wavelengths of an L-band optical signal, which may be referred to as an L-band EDF, using the 980-nm-wavelength region pump light (which may otherwise be referred to herein as "980 nm pump light").

In parallel scheme 200, when a wave division multiplexed (WDM) optical signal (e.g., C+L optical signal) is received at input node 222, the signal first passes through an optical isolator 224. It may be understood that an optical isolator may be a passive magneto-optic device that only allows light to travel in one direction and may be used to protect a source from back reflections or signals that may occur downstream of the isolator. The terms "downstream" and "upstream" herein may be understood to broadly refer to a position of a component relative to a position of a different component in view of the direction of optical signal flow. Thereafter, the optical signal may pass through C/L WDM 226, which may be a splitter (or any other suitable component) configured to split, decouple, or separate the C- and L-bands into respective C- and L-band optical signals.

Pump light from a 980-nm-wavelength region pump laser diode 228 may be combined with the C-band wavelengths of the C-band signal using 980WDM-C 230 (e.g., a combiner), which may then be amplified or boosted by the EDF-C 204. At the L-band side, the 980 nm pump light may be combined with the L-band wavelengths of the L-band signal via 980WDM-L 232 (e.g., a combiner) and then boosted by EDF-L 212. Each of the amplified C-band and L-band signals may then be combined by C/L WDM 234, which may be a combiner or any other suitable combining, multiplexing, or coupling component, passed through optical isolator 236, and input to GFF 238, which may be a nonreflective GFF. The GFF 238 may be considered a common GFF used for gain flattening both the C- and L-band wavelengths in the boosted C+L signal. The amplified and gain flattened signal may then be output at output node 240. The parallel scheme 200 is advantageous in that two optical isolators 224 and 236 are used, which, for example, increases the power efficiency of the C+L EDFA 201. The use of only two optical isolators is possible because of the use of nonreflective GFF technology in scheme 200 as opposed to reflective GFFs.

Figure 12:
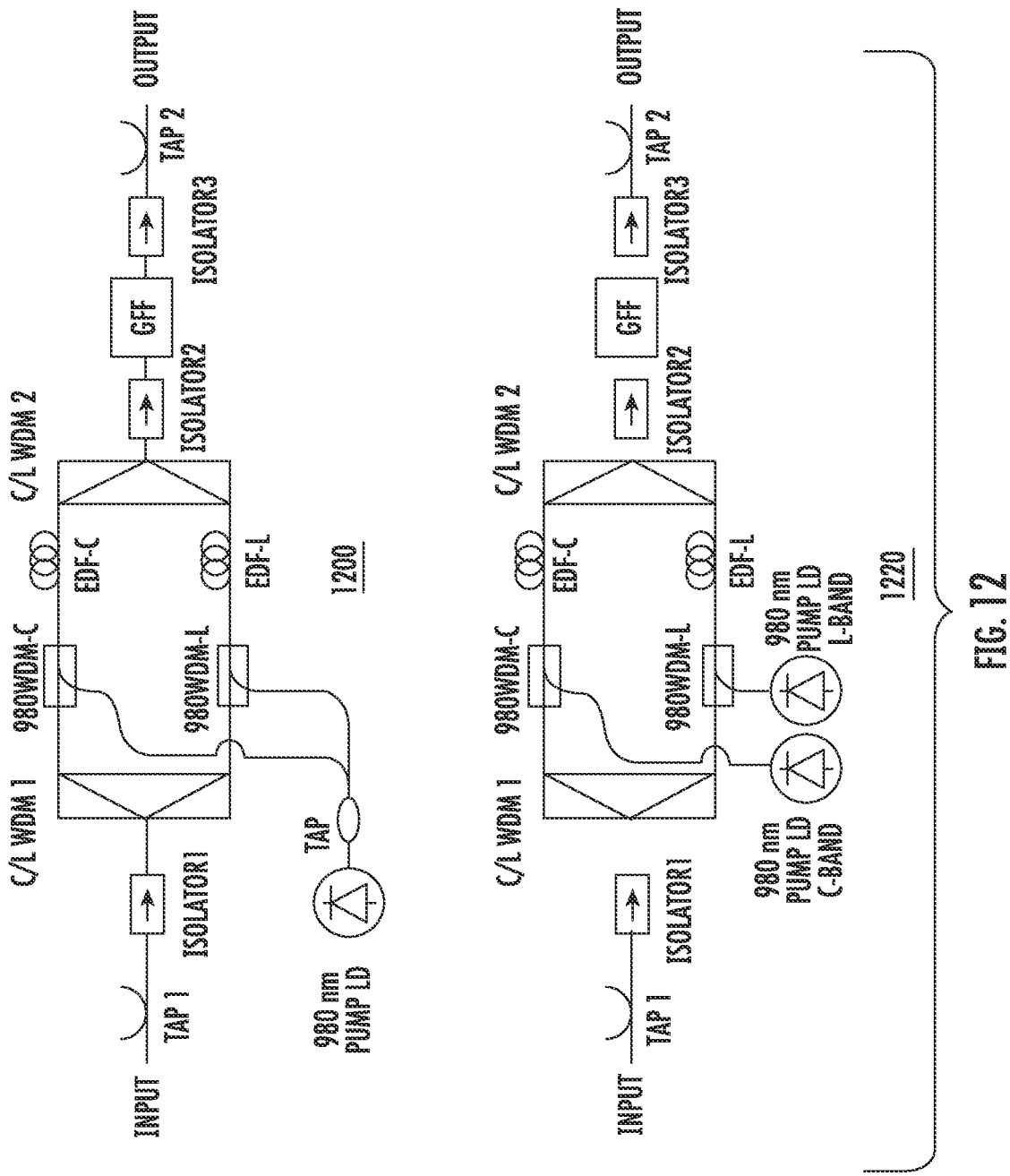
FIG. 12 illustrates example parallel schemes using reflective GFFs.

Two different parallel schemes 1200 and 1220 of C+L EDFAs, each using a reflective GFF, are shown in FIG. 12 and described herein for purposes of contrasting schemes 1200, 1220 against scheme 200 of FIG. 2, which uses a nonreflective GFF. In both schemes 1200 and 1220, the C- and L-band sections share a common reflective GFF, where a minimum of two isolators, one upstream and one downstream of the GFF, are required due to reflections from the GFF. The isolator near the input node is required to avoid performance penalties due to back scattering from the span and other possible reflections in the C+L EDFA (though operation without such isolator is possible). Moreover, the taps at the input and output nodes may be three port devices and the 980 nm wavelength region pump source may be a single laser diode with power splitting between C- and L-bands via fixed passive or adjustable splitters, where each C- and L-bands can have a separate 980 nm pump source (which can be single or multiple laser diodes).

Figure 3:
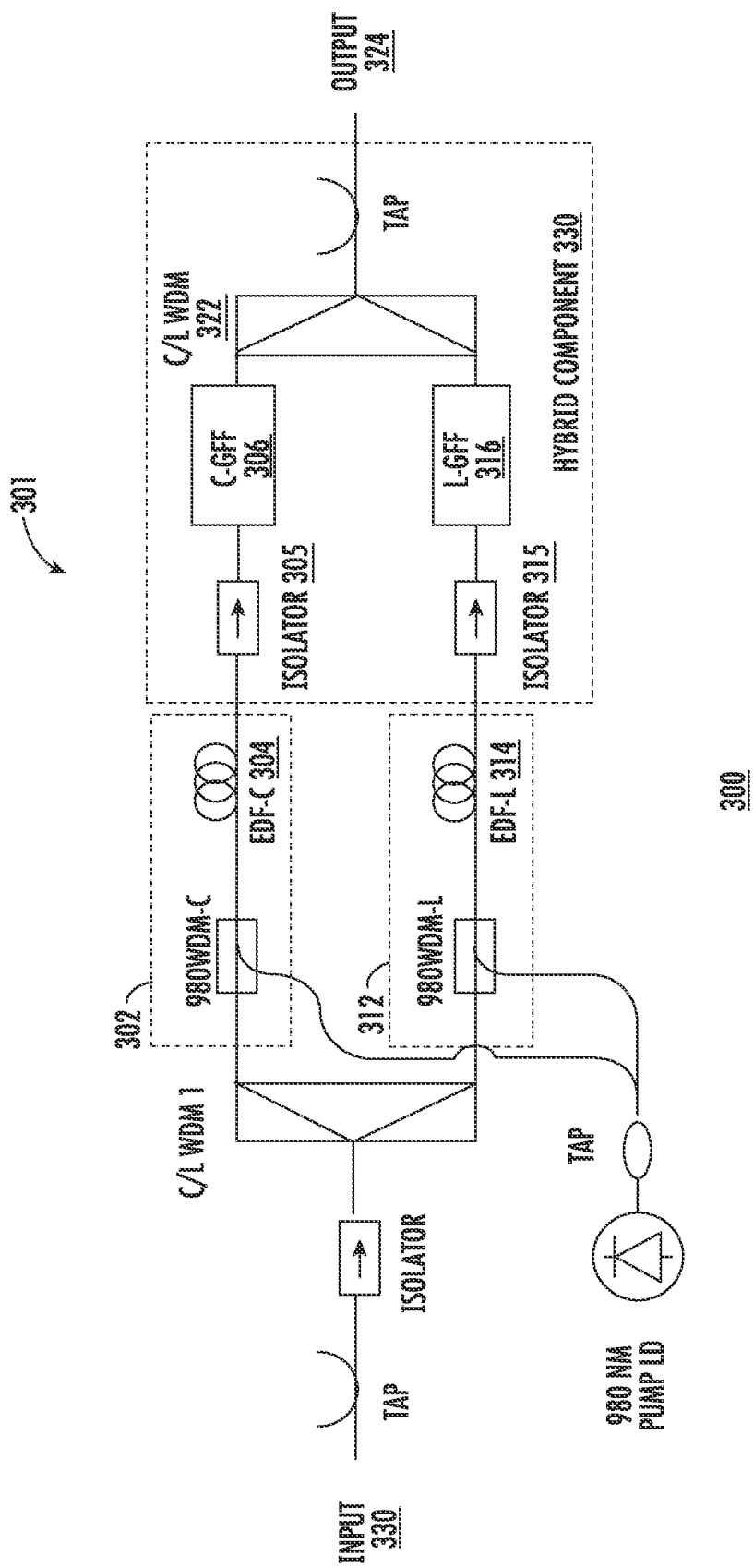
FIG. 3 illustrates a second example parallel scheme of a C+L EDFA.

FIG. 3 illustrates an example parallel scheme 300 of EDFA 301 according to embodiments. The parallel scheme 300 may be identical to the parallel scheme 200 from input node 330 up to the EDF-C 304 and EDF-L 314 components. As shown, a difference between the two schemes 300 and 200 is that parallel scheme 300 uses at least two separate GFFs, for example, C-GFF 306 arranged or coupled in the C-band amplification section 302 and L-GFF 316 arranged or coupled in the L-band amplification section 312. As further shown, an isolator 305 may be arranged or coupled between EDF-C 304 and C-GFF 306 and isolator 315 may be arranged or coupled between EDF-L 314 and L-GFF 316.

In parallel scheme 300, similar to scheme 200, the C-band optical signal may be amplified or boosted by EDF-C 304 using a 980 nm pump light and the L-band optical signal may be boosted by EDF-L 314 using the 980 nm pump light. In the C-band section 302, the amplified C-band is passed through isolator 305 and then passed through C-GFF 306. In the L-band section 212, the amplified L-band is passed through isolator 315 and then passed through L-GFF 316. Thereafter, the gain flattened C- and L-bands may be combined by C/L WDM 322 for outputting an amplified and gain flattened signal at output node 324.

According to examples, at least the isolators 305 and 315, C-GFF 306, L-GFF 316, C/L WDM 322, and an optical fiber tap may be packaged, configured, or arranged together as a hybrid component 330, as indicated by the dashed box. In at least that regard, the hybrid component 300 may advantageously allow easy and effective integration of the separate C- and L-band GFFs into existing amplifier designs or schemes. For example, because the configuration of parallel schemes 200 and 300 are identical up to the C- and L-band EDFs, at least the C/L WDM 234, isolator 236, GFF 238, and optical tap (arranged downstream of GFF 238) in parallel scheme 200 may be replaced by the hybrid component 330 to easily, efficiently, and effectively convert parallel scheme 200 to parallel scheme 300.

Figure 4:
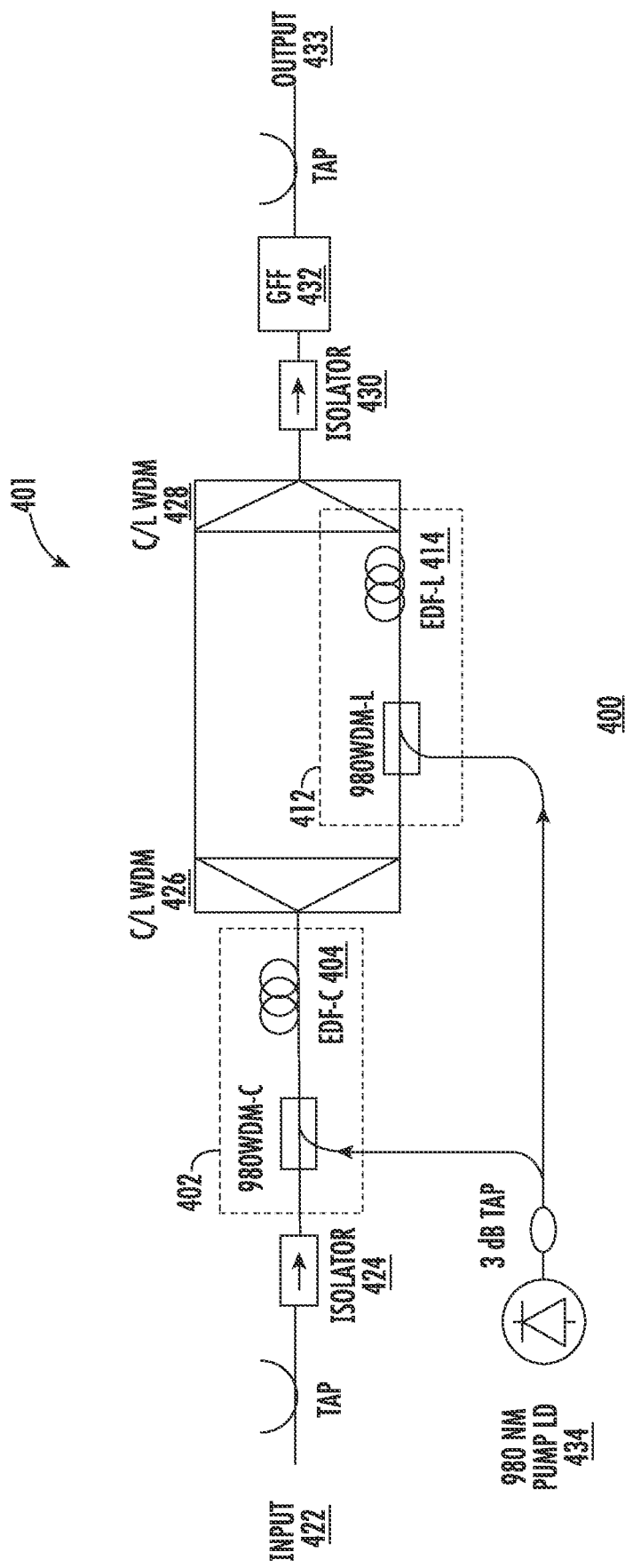
FIG. 4 illustrates a first example serial scheme of a C+L EDFA.

FIG. 4 illustrates an example serial scheme 400 of C+L EDFA 401 according to embodiments. The C+L EDFA 401 includes a C-band amplification section 402 (e.g., C-band amplification stage) and an L-band amplification section 412 (L-band amplification stage), as indicated by the dashed boxes. As shown, the C-band and L-band amplification sections 402 and 412 are configured in a serial or series arrangement, which may be understood to be an arrangement having a single signal path for the C- and L-band amplification sections as opposed to a parallel arrangement that divides into two or more independent paths, e.g., in a serial or series arrangement, the C- and L-band amplification sections are connected such that amplification of an upstream section affects the downstream section. The C-band amplification section 402 includes at least EDF-C 404 configured to amplify the C-band using a 980 nm pump light provided by a pump laser diode 434. The L-band amplification section includes at least EDF-L 414 configured to amplify the L-band.

For example, when an optical signal (e.g., a C+L optical signal) is input or received at input node 422, the signal may pass through an optical tap and then through an optical isolator 424, where the 980 nm pump light is combined or multiplexed with the C-band of the optical signal such that the C-band wavelengths are amplified or boosted by the EDF-C 404. Upon amplifying the C-band, the signal may be input to a C/L WDM 426, which may be a splitter configured to split, decouple, or separate the C- and L-bands of the optical signal.

As shown, the separated C-band signal, which has already been amplified by EDF-C 404 as described above, may then be input to C/L WDM 428. The separated L-band may be combined with the 980 nm pump light and input to EDF-L 414, which may be configured to amplify or boost the L-band. The boosted L-band signal may also be input to the C/L WDM 428.

Figure 13:
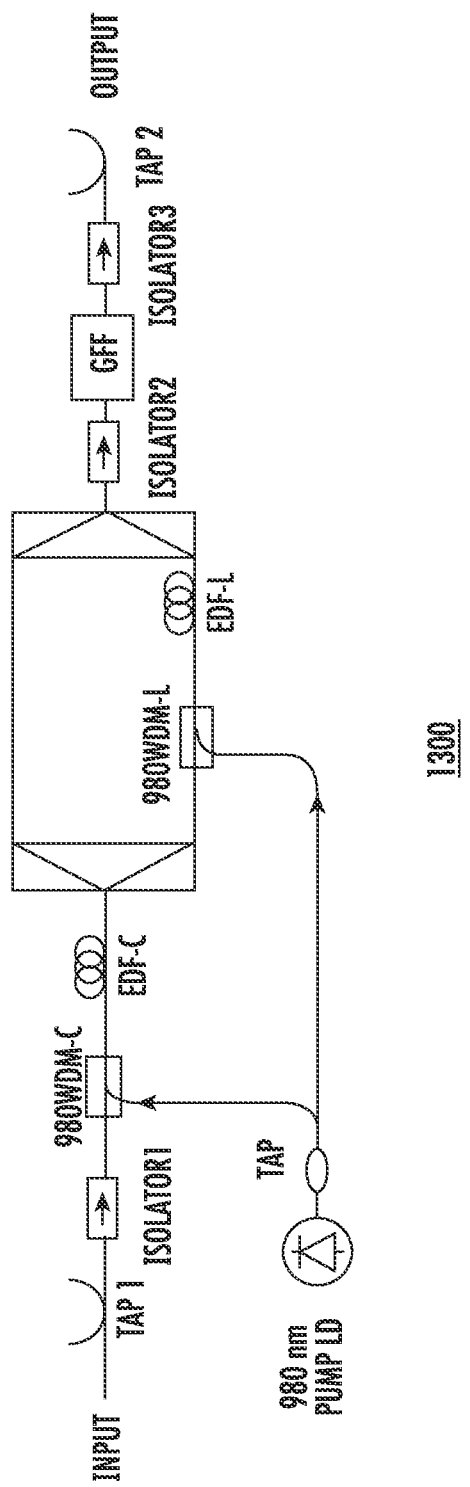
FIG. 13 illustrates an example serial scheme using a reflective GFF.

The C/L WDM 428—e.g., a combiner—may be configured to combine or multiplex the boosted C- and L-band signals and input the boosted C+L signal to an optical isolator 430. Upon passing through the isolator 430, the signal is then provided to common GFF 432 for flattening or equalizing the gain of the boosted C+L signal, which is then passed through an optical tap and then output via output node 433. Similar to parallel scheme 200, the serial scheme 400 also implements two optical isolators 424 and 430, thereby at least advantageously increasing the power efficiency of the C+L EDFA 401. Again, the use of only two optical isolators is possible because of the use of nonreflective GFF technology in scheme 400 as opposed to reflective GFFs. A serial scheme 1300 of a C+L EDFA using a reflective GFF is shown in FIG. 13 and referenced herein for purposes of contrasting scheme 1300 against scheme 400 of FIG. 4, which uses a nonreflective GFF. The descriptions set forth above with respect to FIG. 12 regarding the common reflective GFF, the minimum use of two isolators due to reflections from the GFF, the taps, and the 980 nm wavelength region pump source also apply to FIG. 13.

Figure 5:
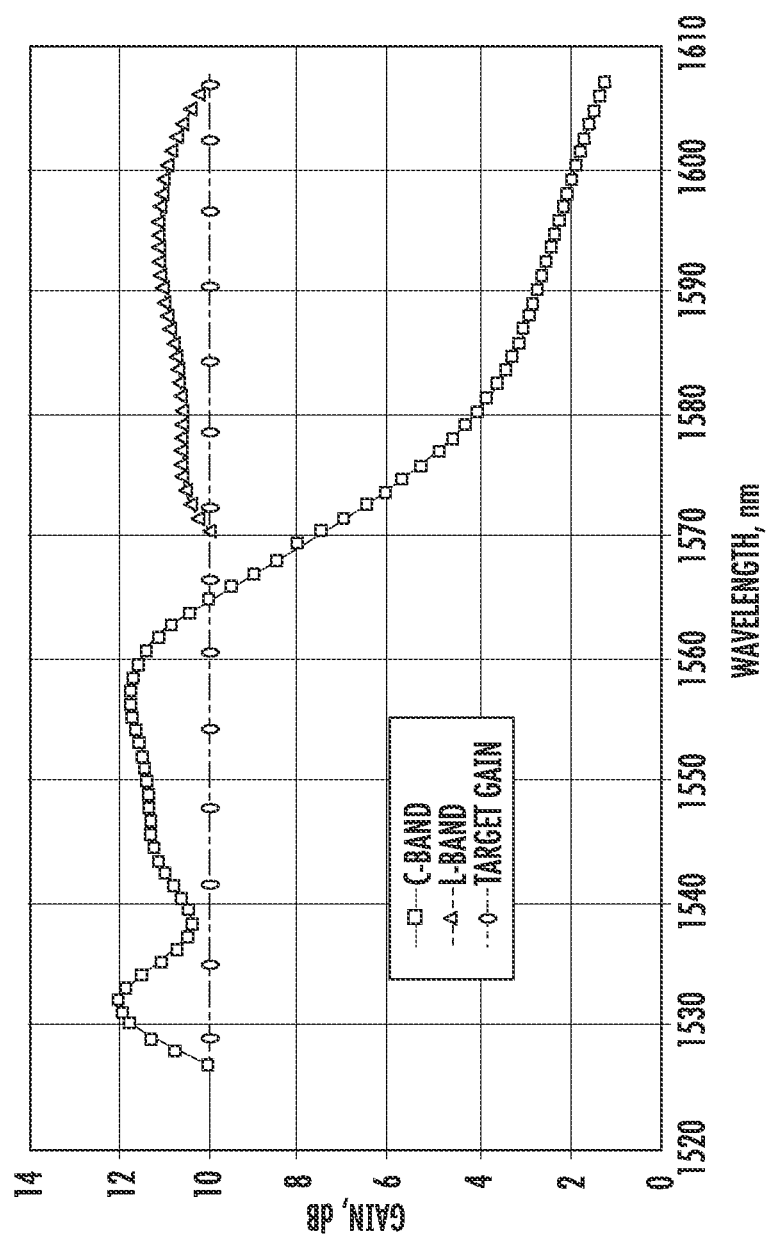
FIG. 5 illustrates an example gain plot.

FIG. 5 illustrates an example gain plot 500 of the serial scheme 400 of C+L EDFA 401 according to embodiments. For example, the illustrated gain plot represents C- and L-band gain for 10 decibel (dB) span loss. As described above, the C- and L-band sections 402 and 412 of the serial scheme 400 share a common GFF 432.

As shown in FIG. 5, the C-band EDF (e.g., EDF-C 404) provides the required 10 dB amplification in the C-band. Moreover, because at least the C-band amplification stage is arranged upstream of the L-band amplification stage in the serial scheme 400, the C-band EDF may provide additional amplification in the L-band, e.g., ranging from approximately one to eight decibels. In examples, the additional amplification may advantageously allow the serial scheme 400 to function as a dual stage amplifier for the L-band, which at least improves the overall power efficiency of C+L EDFA 401.

Figure 6:
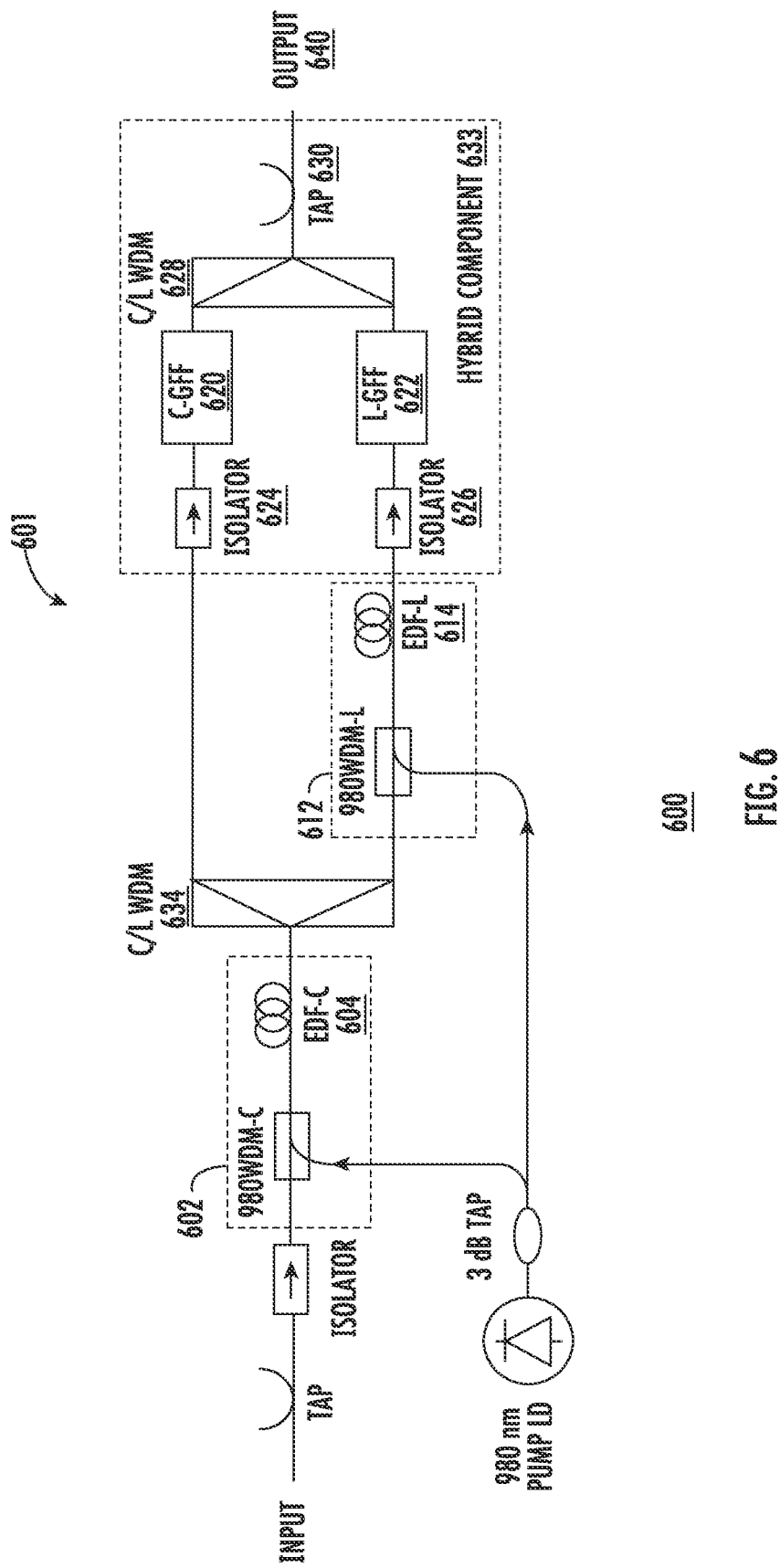
FIG. 6 illustrates a second example serial scheme of a C+L EDFA.

FIG. 6 illustrates an example serial scheme 600 of C+L EDFA 601 according to embodiments. As shown, the serial scheme 600 may be identical to serial scheme 400 from input node up to the EDF-L 614 component. A difference, however, between schemes 400 and 600 is the use of two separate GFFs (e.g., C-GFF 620 for gain flattening the C-band, L-GFF 622 for gain flattening the L-band).

As further shown, isolators 624, 626, C-GFF 620, L-GFF 622, C/L WDM 628, optical tap 630 may be arranged or packaged together to form a hybrid component 633, as indicated by the dashed box. As described above, for example with respect to FIG. 3, the hybrid component 633 may advantageously allow easy and effective integration of the separate C- and L-band GFFs 620 and 622 into existing amplifier designs or schemes, such as serial scheme 400. Since the configuration of serial schemes 400 and 600 are identical up from input node to EDF-L 614, the hybrid component 633 may replace at least the C/L WDM 428, isolator 430, the common GFF 432, and the optical tap in an easy and efficient manner.

In serial scheme 600, the C-band in the C+L signal is boosted by EDF-C 604 in C-band amplification section 602, and thereafter, the C+L signal is split or separated by C/L WDM 634 so that the boosted or amplified C-band signal is input to the isolator 624 and gain flattened by C-GFF 620. The L-band signal split from the C+L signal by the C/L WDM 634 may be boosted or amplified by EDF-L 614 in L-band amplification section 612 via the 980 nm pump light, which may then be fed into the optical isolator 626 and then gain flattened by L-GFF 622. The equalized and/or flattened C- and L-bands may be combined using C/L WDM 628, thereafter the combined C+L signal may be passed through an optical tap 630, and then the signal may be output at output node 640.

Figure 7:
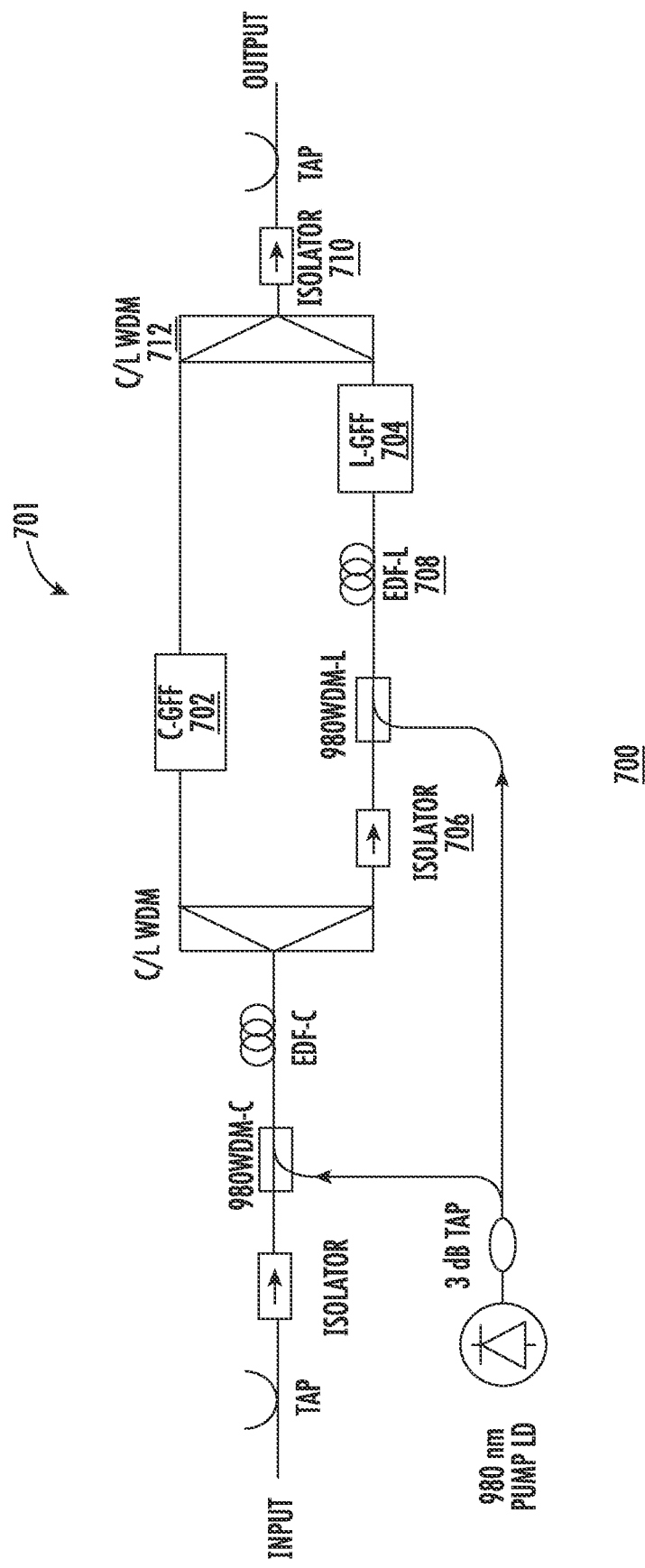
FIG. 7 illustrates a third example serial scheme of a C+L EDFA.

FIG. 7 illustrates an example serial scheme 700 of C+L EDFA 701 according to embodiments. The serial scheme 700 is substantially similar to serial scheme 600 of C+L EDFA 601 (e.g., two separate GFFs—C-GFF 702 and L-GFF 704—are used in the C+L EDFA 701), except that the isolator placements are different.

As shown, for example, an optical isolator 706 may be placed, arranged, or coupled before, behind, or upstream of EDF-L 708 so that optical isolation of the L-band is performed before the L-band signal is boosted or amplified. Moreover, an optical isolator 710 may be placed after, in front of, or downstream of C/L WDM 712 such that isolation is performed on a boosted or amplified and combined C+L signal (e.g., where both the C- and L-bands are amplified and combined) by the optical isolator 710.

Figure 8:
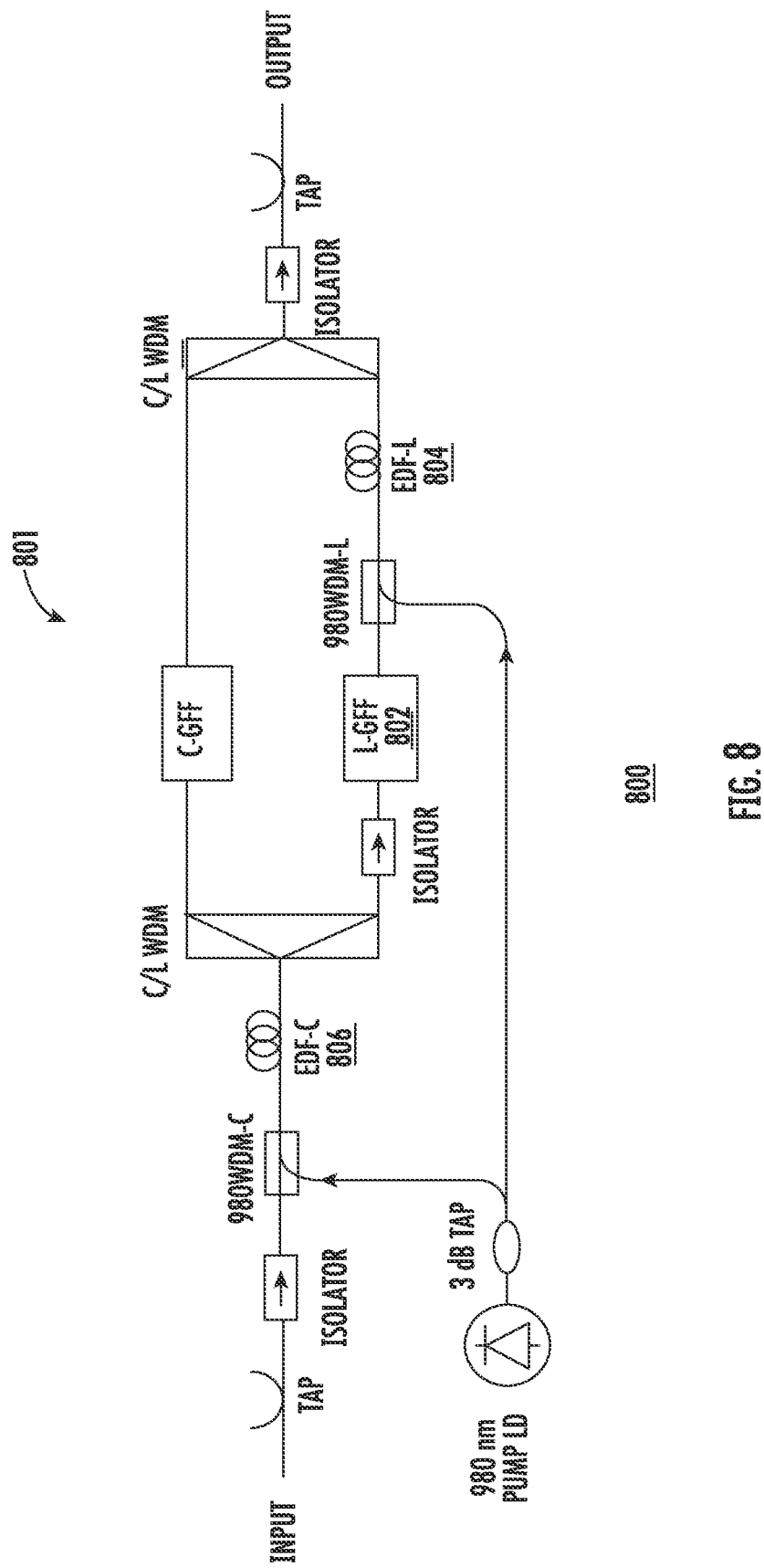
FIG. 8 illustrates a fourth example serial scheme of a C+L EDFA.

FIG. 8 illustrates an example serial scheme 800 of C+L EDFA 801 according to embodiments. The serial scheme 800 is substantially similar to serial scheme 700 of C+L EDFA 701 described above (e.g., the user of separate C- and L-band GFFs) with the exception of a notable distinction: that the L-band GFF (e.g., L-GFF 802) is placed, arranged, or coupled before, behind, or upstream of the L-band amplifier (e.g., EDF-L 804). In at least that regard, the L-GFF 802 may be considered an "interstage" GFF, which means that the L-band GFF is located between the C- and L-band amplification sections or stages.

Because, for example, the EDF-C 806 provides additional amplification in the L-band (e.g., ranging from approximately 1 to eight decibels), at least an advantage of the interstage L-GFF 802 of serial scheme 800 may be, for example, filtering certain wavelengths of the L-band prior to amplifying the L-band signal using EDF-L 804, which will be further described in detail below. Moreover, an advantage of the interstage L-band GFF 802 being located between the C- and L-band amplification sections is similar to the benefit of mid-stage GFF in dual stage C- or L-band EDAs, which is the improvement of power efficiency in the C+L EDFA 801.

Figure 9:
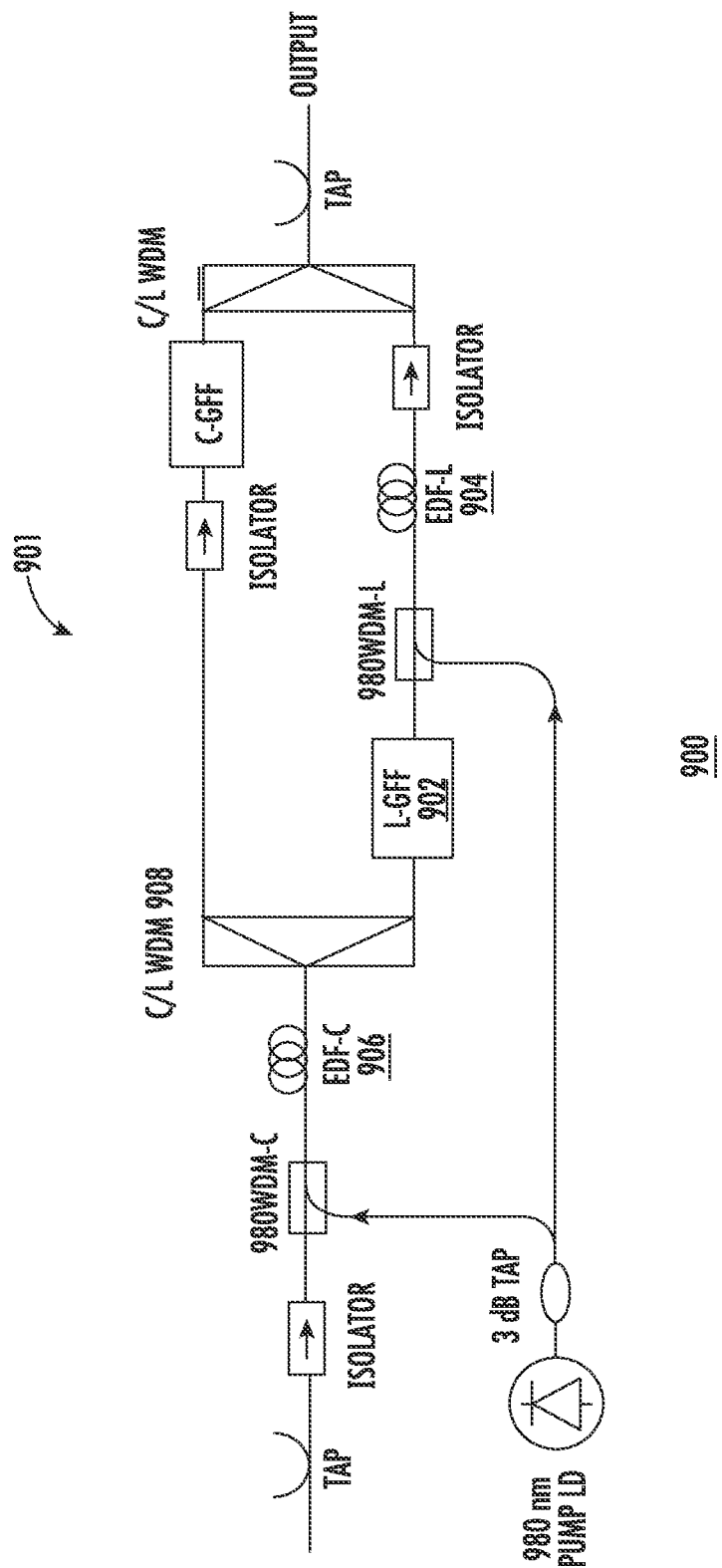
FIG. 9 illustrates a fifth example serial scheme of a C+L EDFA.

FIG. 9 illustrates an example serial scheme 900 of C+L EDFA 901 according to embodiments. The serial scheme 900 is substantially similar to the serial scheme 600 of C+L EDFA 601 except that an interstage GFF (e.g., L-GFF 902) is located between the C-band and L-band amplification sections similar to serial scheme 800. As shown, the L-GFF 902 is placed, arranged, or coupled before, behind, or upstream of EDF-L 904, which is the L-band EDF.

The additional amplification of the L-band (e.g., ranging from approximately 1 to eight decibels) provided by the EDF-C 906 prior to the optical signal being split into separate C-band and L-band signals by C/L WDM 908 may be flattened or equalized by the interstage L-GFF 902 prior to amplifying the split L-band signal using EDF-L 904. Similar to serial scheme 800, an advantage of the interstage GFF configuration is that it improves the overall power efficiency of the C+L EDFA 901. Further, the interstage L-GFF 902 advantageously provides gain tilt correction functionality and other advantages, which will be further described in detail below.

Figure 10:
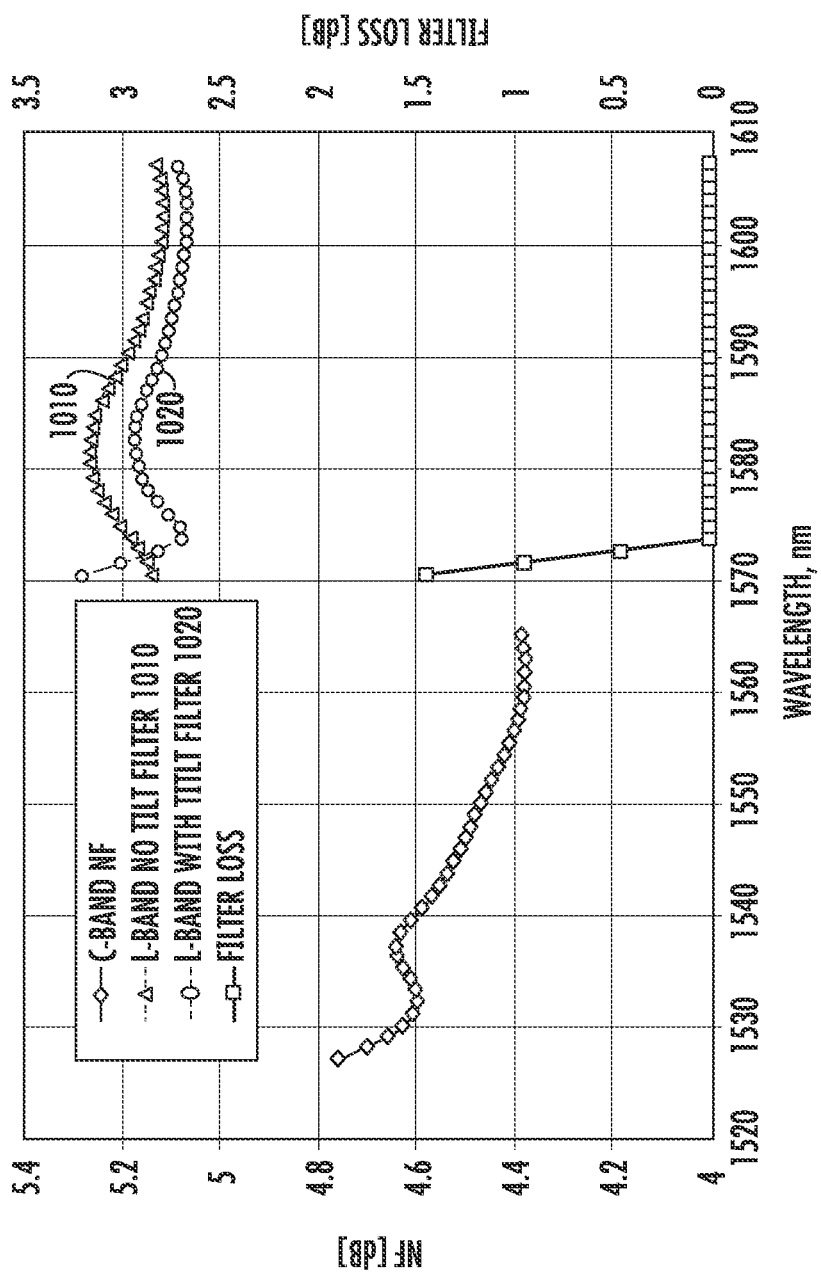
FIG. 10 illustrates an example noise figure (NF) plot.

FIG. 10 illustrates an example noise figure (NF) plot 1000 of a serial scheme with an interstage GFF (e.g., serial scheme 800, serial scheme 900) according to embodiments. As shown by the NF plot 1000, the interstage GFF, for example, may advantageously provide gain tilt correction or tilt filter functionality. It may be understood that gain tilt refers to the slope of optical gain across a certain wavelength window, which may be an indication of the gain flatness of an amplifier.

When no gain tilt filter functionality is provided, as illustrated by plot 1010, the additional gain in the L-band provided by the C-band EDF may result in lower average inversion, a higher noise figure, and may also require a physically longer L-band EDF. With tilt filter functionality, the noise figure of the L-band is lower, as shown by plot 1020, and further, the tilt filter may be considered a "lossless" filter with loss at the shorter L-band wavelengths thereby at least reducing the length of the L-band EDF by approximately six percent and an improvement of the noise figure by approximately 0.06 decibels. It may be understood that other C+L EDFA components, in addition to the interstage GFF, may support or provide the tilt filter functionality, such as the C/L WDM combiner, etc.

Figure 11:
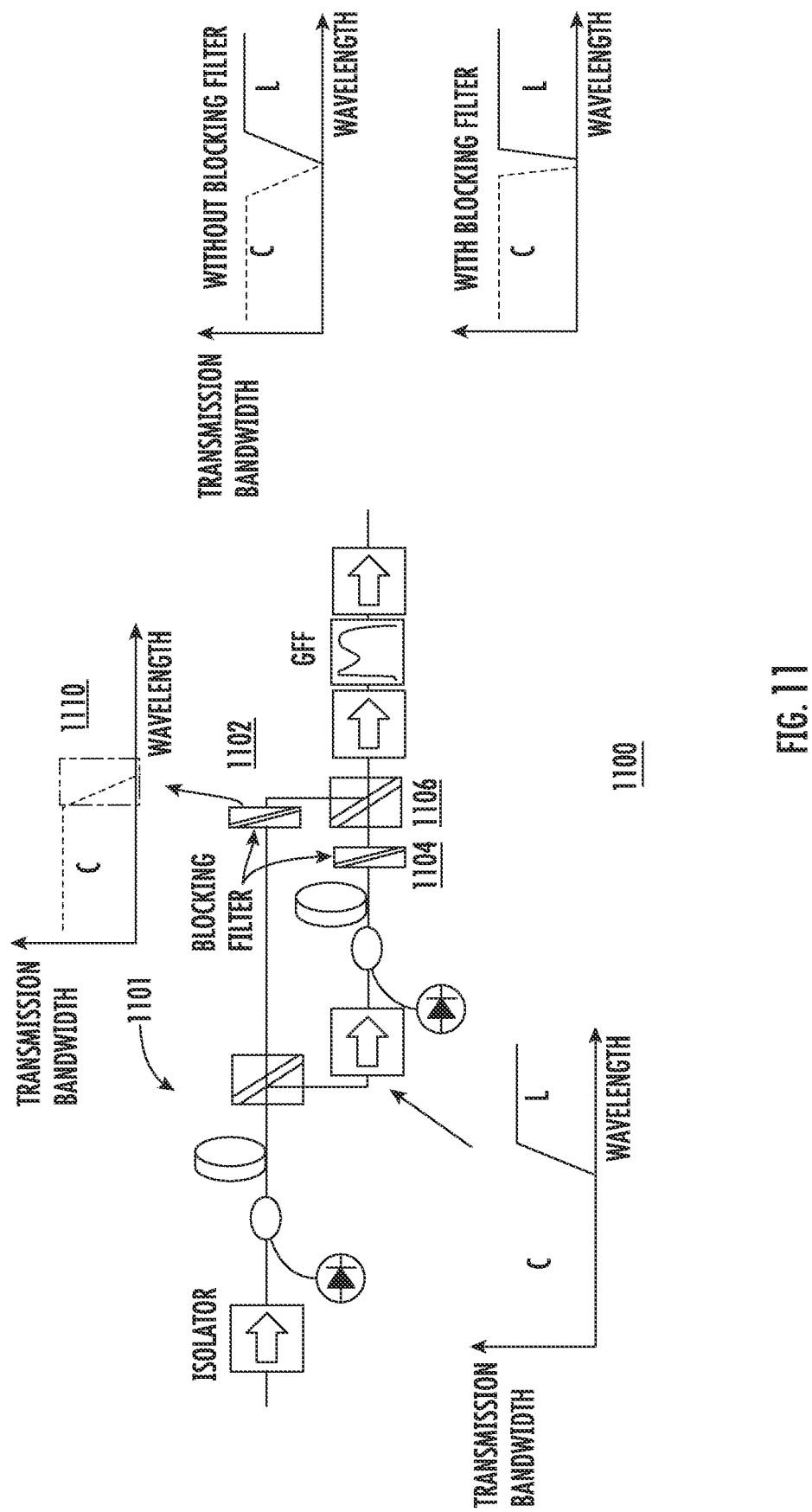
FIG. 11 illustrates an example guard band reduction.

FIG. 11 illustrates an example guard band reduction 1100 for C+L EDFA 1101 according to embodiments. Generally, C/L WDM combiners may have limited resolution, which may result in a wide guard band (e.g., 3 to 5 nm) without the use of blocking filters. It may be understood that guard bands may be required to avoid cross talk between the C- and L-bands in the transitional location of the bandwidth.

As shown in FIG. 11, blocking filters 1102 and 1104 may be arranged immediately before or behind C/L WDM 1106 so that the filters can receive and perform guard band reduction on the amplified C- and L-bands prior to the C/L WDM 1106 combining the C- and L-bands. As further shown by dashed box 1110, for example, the guard band of the C-band may be narrowed or shortened using blocking filter 1102. Similarly, blocking filter 1104 may narrow or shorten the guard band of the L-band. The resulting width of the guard band of the combined C- and L-bands is narrower (e.g., approximately 1 nm) compared to the guard band width of the combined bands when no blocking filters are applied. For example, the blocking filters may use or integrate thin film filters (TFFs) or other suitable types of filters or components. Accordingly, one of the advantages of integrating blocking filters in C+L EDFAs is lowering insertion loss.

As set forth above, the above-described parallel and serial C+L EDFA schemes and configurational variations thereto are advantageous in numerous ways. For example, both the parallel and serial schemes provide improved power efficiency of the EDFA by minimizing the use of passive EDFA components, such as optical isolators, when using nonreflective GFFs or nonreflective gain flattening technologies as opposed to reflective GFFs. Moreover, the parallel and serial schemes having a common GFF and the parallel and serial schemes having separate C- and L-band GFFs both share similar architectures, which allows the output architectures of the schemes to be included in a hybrid component for easy and efficient integration into the C+L EDFA. Further, as described above, the interstage GFF variation of the serial scheme provides at least: (i) improved power efficiency depending on total amplifier gain and background loss of the GFF, for example, for 10 dB span loss and 0.6 dB GFF background loss, the total pump power is reduced by approximately 0.5 dB, (ii) gain flattening and/or gain flattening with gain equalization to shorten the L-band EDF and improve average inversion and reduce NF, and (iii) tilt correction or tilt filter functionality. Additionally, blocking filters may be utilized to narrow or reduce the width of the guard band in the combined C- and L-bands to increase the effective transmission bandwidth.

It may be understood that the above-described parallel and serial C+L EDFA schemes can be arranged in various and different arrangements, for example, the order or sequence of the C- and L-band amplification stages can be switched in the serial schemes, etc., and not be limited to any particular arrangement or in any other manner.

Herein, a novel and inventive techniques for improving gain equalization in C+L EDFAs are disclosed. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings.

Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An apparatus comprising:
    a C-band amplification section;
    an L-band amplification section;
    a first gain flattening filter (GFF) for performing C-band gain equalization, the first GFF coupled and arranged subsequent to the C-band amplification section;
    a second GFF, different from the first GFF, for performing L-band gain equalization, the second GFF coupled and arranged subsequent to the L-band amplification section;
    a first optical isolator arranged or coupled between the first EDF of the C-band amplification section and the first GFF; and
    a second optical isolator arranged or coupled between the second EDF of the L-band amplification section and the second GFF;

wherein the C-band amplification section includes at least a first erbium doped fiber (EDF) for amplifying a C-band optical signal;

wherein the L-band amplification section includes at least a second EDF for amplifying an L-band optical signal;

wherein the C-band amplification section and the L-band amplification section are configured in a parallel arrangement; and wherein at least the first and second optical isolators and the first and second GFFs form a hybrid component.

2. The apparatus of claim 1, further comprising:

a third optical isolator for receiving an input signal; and a splitter for splitting the input signal to the C-band and L-band optical signals.

3. The apparatus of claim 1, wherein the first and second GFFs are coupled to or arranged after or downstream of the first and second EDFs, respectively, such that the first and second GFFs perform gain equalization of the amplified C-band and L-band signals.

4. The apparatus of claim 3, further comprising a combiner for combining the amplified and gain equalized C-band and L-band signals for output.

5. The apparatus of claim 1, wherein the first and second EDFs perform amplification using a 980 nm pump light provided by a laser diode.

* * * * *